US012119593B2

(12) United States Patent
Li et al.

(10) Patent No.: US 12,119,593 B2
(45) Date of Patent: Oct. 15, 2024

(54) POWER PLUG WITH LEAKAGE CURRENT DETECTION INTERRUPTER

(71) Applicant: Chengli Li, Suzhou (CN)

(72) Inventors: Chengli Li, Suzhou (CN); Xiaoming Zhang, Suzhou (CN)

(73) Assignee: Chengli Li, Suzhou (CN)

( * ) Notice: Subject to any disclaimer, the term of this patent is extended or adjusted under 35 U.S.C. 154(b) by 529 days.

(21) Appl. No.: 17/476,236

(22) Filed: Sep. 15, 2021

(65) Prior Publication Data

US 2023/0082601 A1 Mar. 16, 2023

(30) Foreign Application Priority Data

Sep. 13, 2021 (CN) ........................ 202122205079.X

(51) Int. Cl.

| | |
|---|---|
| ***H01R 13/70*** | (2006.01) |
| ***H01R 13/713*** | (2006.01) |
| ***H01R 24/30*** | (2011.01) |
| *H01R 103/00* | (2006.01) |

(52) U.S. Cl.

CPC ........... *H01R 13/713* (2013.01); *H01R 24/30* (2013.01); *H01R 2103/00* (2013.01)

(58) Field of Classification Search

None

See application file for complete search history.

(56) References Cited

U.S. PATENT DOCUMENTS

| | | | | |
|---|---|---|---|---|
| 6,755,676 B2 * | 6/2004 | Milan | H01R 25/003 | 439/620.29 |
| 7,497,740 B2 * | 3/2009 | Mei | H01R 25/003 | 439/651 |
| 7,672,098 B2 * | 3/2010 | Zhang | H01R 13/665 | 174/521 |
| 11,005,260 B2 * | 5/2021 | Li | H02H 1/0007 | |
| 11,469,556 B2 * | 10/2022 | Li | H01R 13/713 | |
| 2021/0225606 A1 * | 7/2021 | Li | H01H 71/2463 | |
| 2023/0009042 A1 * | 1/2023 | Li | H01B 11/1091 | |
| 2023/0071911 A1 * | 3/2023 | Li | H01R 13/53 | |
| 2023/0352885 A1 * | 11/2023 | Li | H01R 24/28 | |
| 2023/0361514 A1 * | 11/2023 | Li | H01R 13/713 | |
| 2024/0112872 A1 * | 4/2024 | Zhang | H01H 50/44 | |

* cited by examiner

*Primary Examiner* — Felix O Figueroa
(74) *Attorney, Agent, or Firm* — Chen Yoshimura LLP

(57) ABSTRACT

A power plug with LCDI includes a shell, multiple input insertion prongs partially exposed to an exterior of the shell, a movement assembly disposed in the shell and coupled to the multiple input insertion prongs, a male end assembly and a female end assembly both disposed in the shell, and multiple output conductors. A first end of the male end assembly is connected to the movement assembly and electrically coupled to the multiple input insertion prongs via the movement assembly; a second end of the male end assembly is inserted into a first end of the female end assembly; a second end of the female end assembly is electrically coupled to the multiple output conductors; and the movement assembly is configured to establish or cut off an electrical connection between the multiple input insertion prongs and the multiple output conductors. This power plug improves efficiency of assembly.

7 Claims, 7 Drawing Sheets

POWER PLUG WITH LEAKAGE CURRENT DETECTION INTERRUPTER

BACKGROUND OF THE INVENTION

Field of the Invention

This invention relates to electrical circuit protection, and in particular, it relates to a power plug with leakage current detection interrupter (LCDI).

Description of Related Art

A power plug with LCDI includes a plug head containing the circuit interrupter, where the electrical cord of the power plug is physically joined to the plug head and electrically connected to the circuit interrupter. In conventional power plugs with LCDI, the conductor wires of the cord at the tail end are typically connected to the plug head by soldering or by crimping using screws. These methods are time consuming to assemble.

SUMMARY

To address the above problem, embodiments of the present invention provide a power plug with LCDI, which includes: a shell; a plurality of input insertion prongs, partially exposed to an exterior of the shell; a movement assembly disposed in the shell and coupled to the plurality of input insertion prongs; a male end assembly disposed in the shell; a female end assembly disposed in the shell; and a plurality of output conductors; wherein a first end of the male end assembly is connected to the movement assembly and electrically coupled to the plurality of input insertion prongs via the movement assembly, a second end of the male end assembly is inserted into a first end of the female end assembly, a second end of the female end assembly is electrically coupled to the plurality of output conductors, and the movement assembly is configured to establish or cut off an electrical connection between the plurality of input insertion prongs and the plurality of output conductors.

In some embodiments, the power plug further includes a connector disposed in the shell, the connector including affixing components to affix the female end assembly.

In some embodiments, the affixing components include a plurality of holding notches on the connector.

In some embodiments, the affixing components include a plurality of clamps on the connector.

In some embodiments, the plurality of input insertion prongs include a first insertion prong and a second insertion prong, the male end assembly includes a first male terminal and a second male terminal, the female end assembly includes a first female terminal and a second female terminal, and the plurality of output conductors include a first output conductor and a second output conductor, wherein the first insertion prong and the second insertion prong are respectively coupled to a first end of the first male terminal and a first end of the second male terminal via the movement assembly, a second end of the first male terminal and a second end of the second male terminal are respectively coupled to a first end of the first female terminal and a first end of the second female terminal, and a second end of the first female terminal and a second end of the second female terminal are respectively coupled to the first output conductor and the second output conductor.

In some embodiments, the plurality of input insertion prongs further include a third insertion prong, the male end assembly further includes a third male terminal, the female end assembly further includes a third female terminal, and the plurality of output conductors further include a third output conductor, wherein the third insertion prong is coupled to a first end of the third male terminal via the movement assembly, a second end of the third male terminal is coupled to a first end of the third female terminal, and a second end of the third female terminal is coupled to the third output conductor.

In some embodiments, the plurality of output conductors further include a first shield conductor, the male end assembly further includes a fourth male terminal, and the female end assembly further includes a fourth female terminal, wherein a second end of the fourth male terminal is coupled to a first end of the fourth female terminal, and a second end of the fourth female terminal is coupled to the first shield conductor.

In some embodiments, the shell includes a lower shell portion and an upper shell portion.

In some embodiments, the upper shell portion includes a first upper shell portion and a second upper shell portion.

In some embodiments, the power plug further includes a reset switch or a test switch or both a reset switch and a test switch, coupled to the movement assembly.

In the power plug according to embodiments of the present invention, the output conductors are connected to the internal components of the plug head using an insertion-type connection, which improves efficiency of assembly of the power plug.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc.

It should be further understood that when describing the various components, directional terms such as "up," "down," "top," "bottom" etc. are not absolute but are relative. These terms are consistent with the view in FIG. 1, but when the views or the relative positions of the components change, these expressions may correspondingly change.

Embodiments of the present invention provide a power plug with LCDI, which includes a shell, a plurality of input insertion prongs, a movement assembly, a male end assembly, a female end assembly, and a plurality of output conductors. The plurality of input insertion prongs are partially exposed to an exterior of the shell, and are coupled to the movement assembly. The movement assembly is disposed in the shell, and both the male end assembly and the female end assembly are disposed in the shell. A first end of the male end assembly is connected to the movement assembly and electrically coupled to the plurality of input insertion prongs via the movement assembly, and a second end of the male end assembly is inserted into a first end of the female end assembly. A second end of the female end assembly is electrically coupled to the plurality of output conductors. The movement assembly is configured to establish or cut off an electrical connection between the plurality of input insertion prongs and the plurality of output conductors.

The power plug according to embodiments of the present invention is described in more detail below with reference to the drawings.

Figure 3:
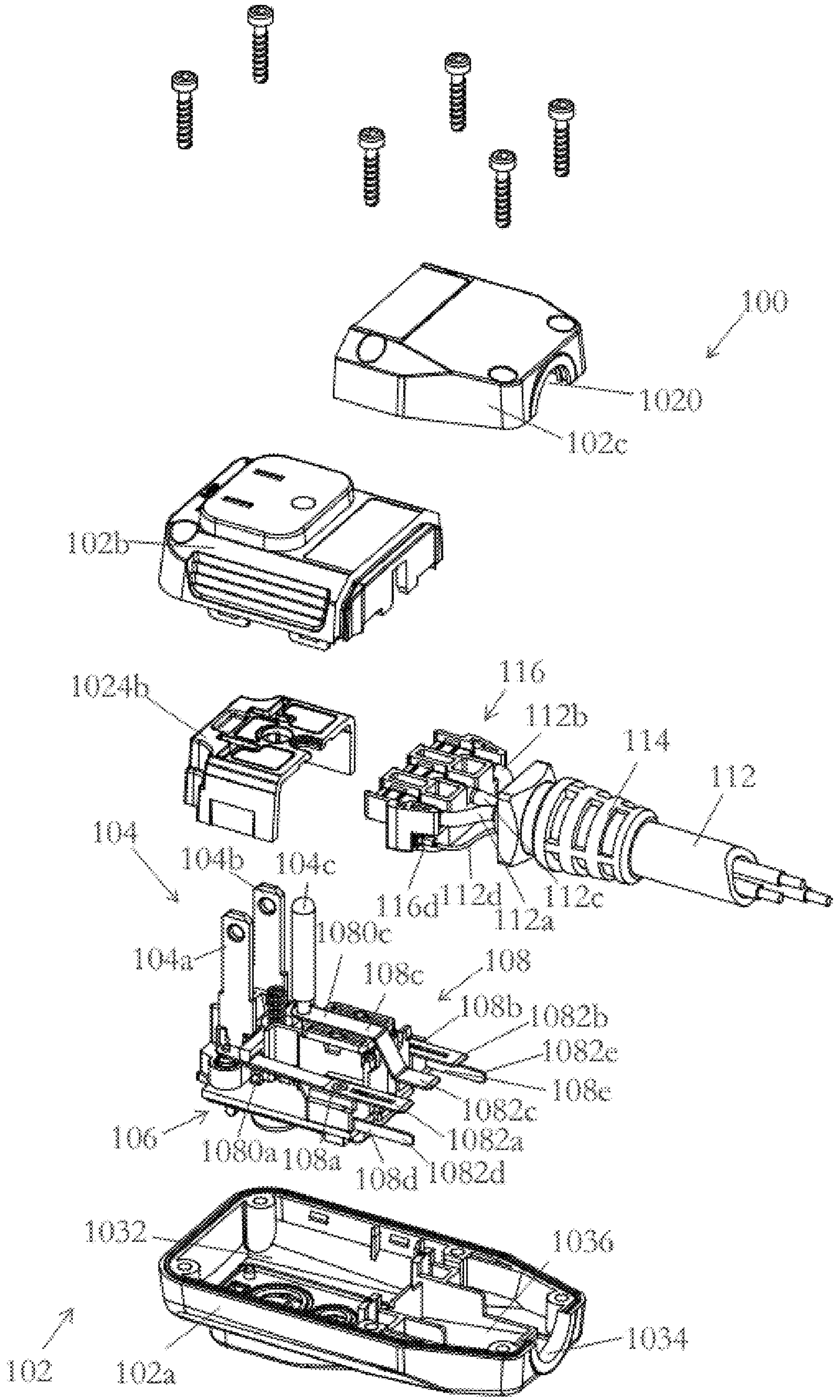
FIG. 3 is a further exploded view of the power plug of FIG. 1.

In the following descriptions, directional terms such as front, rear, left, right, up, down, front end, rear end, left end, right end, upper portion, lower portion, left side, right side, longitudinal, transverse, etc. are relative terms with reference to the orientation of FIGS. 1 and 3.

Referring to FIGS. 1-5, the LCDI power plug 100 includes a shell 102, a group of input insertion prongs 104, a movement assembly 106, a male end assembly 108, and a female end assembly 110. The shell 102 includes a lower shell portion 102*a*, a first upper shell portion 102*b*, and a second upper shell portion 102*c*. The lower shell portion 102*a*, first upper shell portion 102*b* and second upper shell portion 102*c* are joined to each other by screws and threads or other suitable fasteners. The input insertion prongs 104 are configured to be inserted into a power receptacle of an external power source to receive power to be supplied to the load. The group of input insertion prongs 104 includes a first insertion prong 104*a* (which may be flat plate shaped), a second insertion prong 104*b* (which may be flat plate shaped), and a third insertion prong 104*c* (which may be a round shape, typically for the ground). Parts of the first insertion prong 104*a*, second insertion prong 104*b* and third insertion prong 104*c* are exposed to the exterior of the first upper shell portion 102*b* through corresponding holes on the first upper shell portion 102*b*.

The male end assembly 108 includes first to fifth male terminals 108*a* to 108*e*. As shown in FIG. 3, the left end 1080*a* of the first male terminal 108*a* (the first end), the left end (not shown) of the second male terminal 108*b*, the left end 1080*c* of the third male terminal 108*c*, the left end (not shown) of the fourth male terminal 108*d*, and the left end (not shown) of the fifth male terminal 108*e* are affixed on the movement assembly 106. The female end assembly 110 includes first to fifth female terminals 110*a* to 110*e*. As shown in FIG. 3, the right end 1082*a* of the first male terminal 108*a* (the second end), the right end 1082*b* of the second male terminal 108*b*, the right end 1082*c* of the third male terminal 108*c*, the right end 1082*d* of the fourth male terminal 108*d*, and the right end 1082*e* of the fifth male terminal 108*e* are respectively inserted into the left end of the first female terminal 110*a*, the left end of the second female terminal 110*b*, the left end of the third female terminal 110*c*, the left end of the fourth female terminal 110*d*, and the left end of the fifth female terminal 110*e*.

The output conductor bundle 112 of the cord include a hot (L) conductor 112*a* (the first output conductor), a neutral (N) conductor 112*b* (the second output conductor), a ground (G) conductor 112*c* (the third output conductor), a shield conductor 112*d* (the first shield conductor), and another shield conductor 112*e* (the second shield conductor). The movement assembly 106 includes control elements, such that the movement assembly 106 is configured to control the electrical connection between the input insertion prongs 104 and the output conductor bundle 112.

It should be understood that in alternative embodiments, the first upper shell portion 102*b* and second upper shell portion 102*c* may be formed integrally to form an upper shell portion. In other alternative embodiments, the output conductor bundle 112 may include only one shield conductor, i.e. only one of the first and second shield conductors 112*d* and 112*e*, or include three or more shield conductors.

Figure 1:
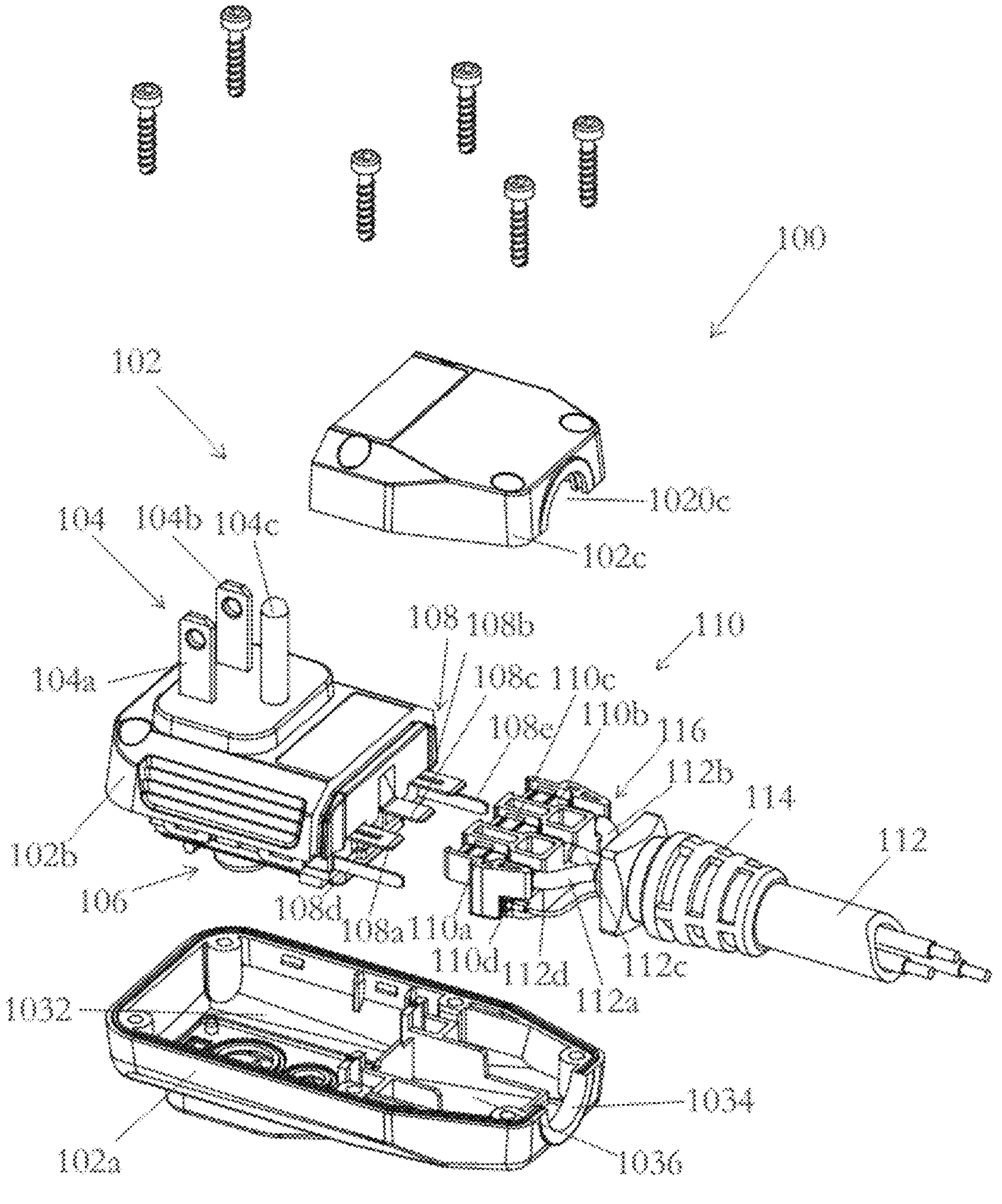
FIG. 1 is an exploded view of a power plug with LCDI according to an embodiment of the present invention.
Figure 2:
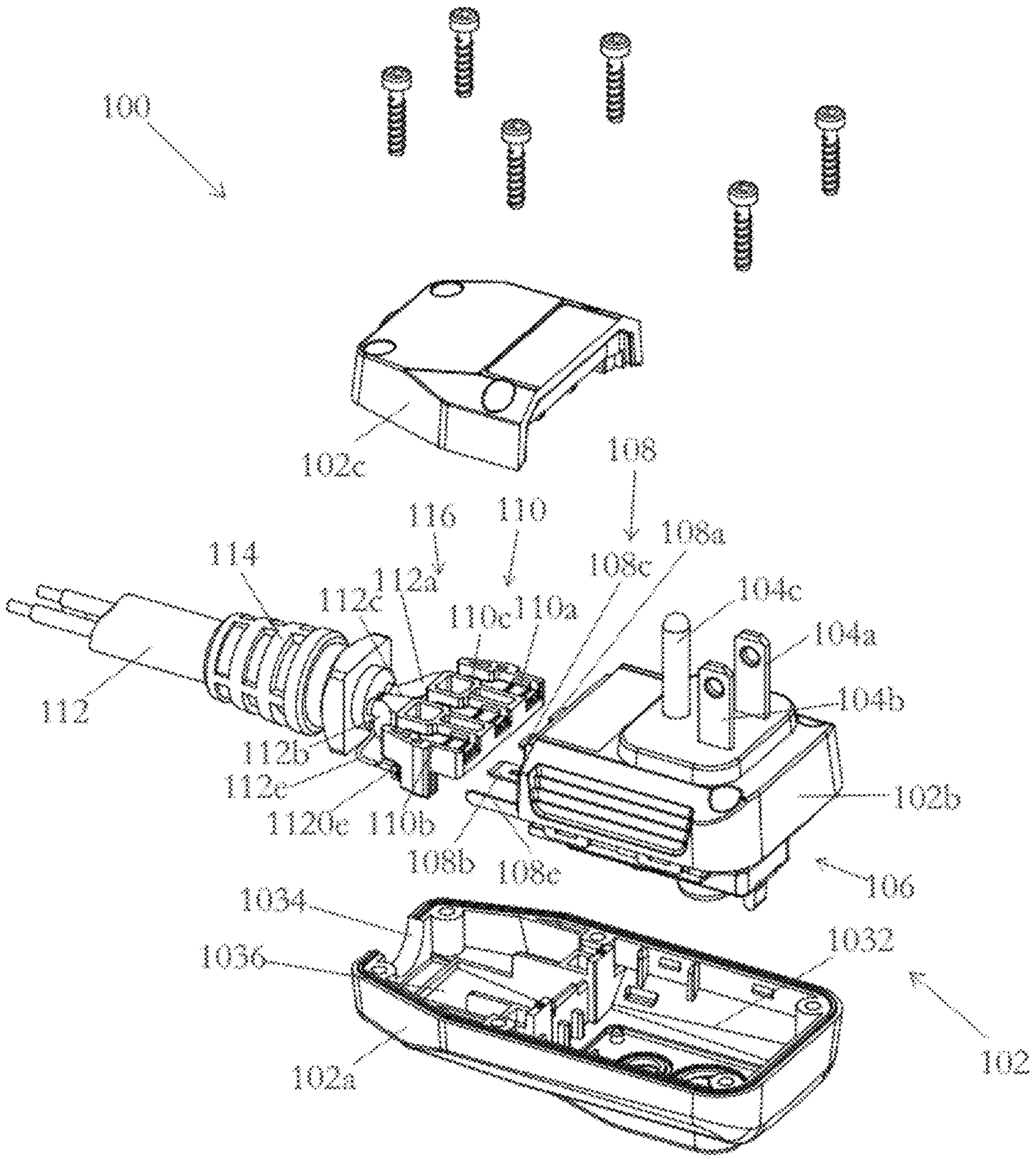
FIG. 2 is another exploded view of the power plug of FIG. 1 from another angle.
Figure 5:
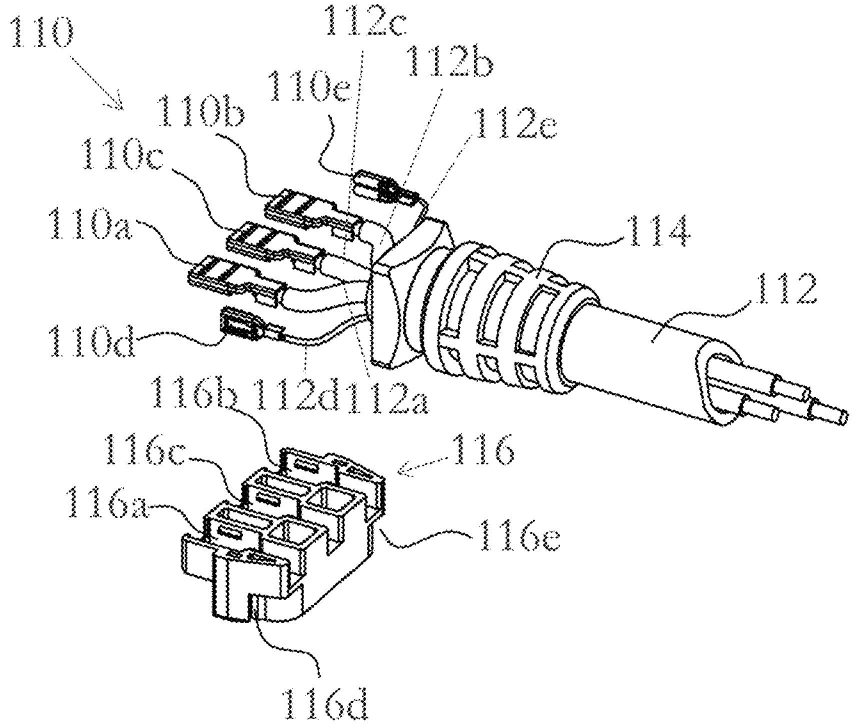
FIG. 5 is an enlarged view of a portion of the power plug shown in FIG. 3.

As shown in FIGS. 1 and 5, the right end of the first female terminal 110*a* (i.e. the second end), the right end of the second female terminal 110*b*, the right end of the third female terminal 110*c*, the right end of the fourth female terminal 110*d*, and the right end of the fifth female terminal 110*e* are respectively connected to the hot conductor 112*a*, the neutral conductor 112*b*, the ground conductor 112*c*, the first shield conductor 112*d* and the second shield conductor 112*e*.

As shown in FIGS. 1-5, the output conductor bundle 112 includes a cable strain relief 114 that surrounds a part of the bundle. The cable strain relief 114 is affixed to the shell via a slot 1020*c* of the second upper shell portion 102*c* and a slot 1034 of the lower shell portion 102*a*, to enhance the bend-resistance of the cable. The cable strain relief 114 also achieves the seamless assembly of the second upper shell portion 102*c* and lower shell portion 102*a*, improving the exterior appearance of the power plug.

Figure 4:
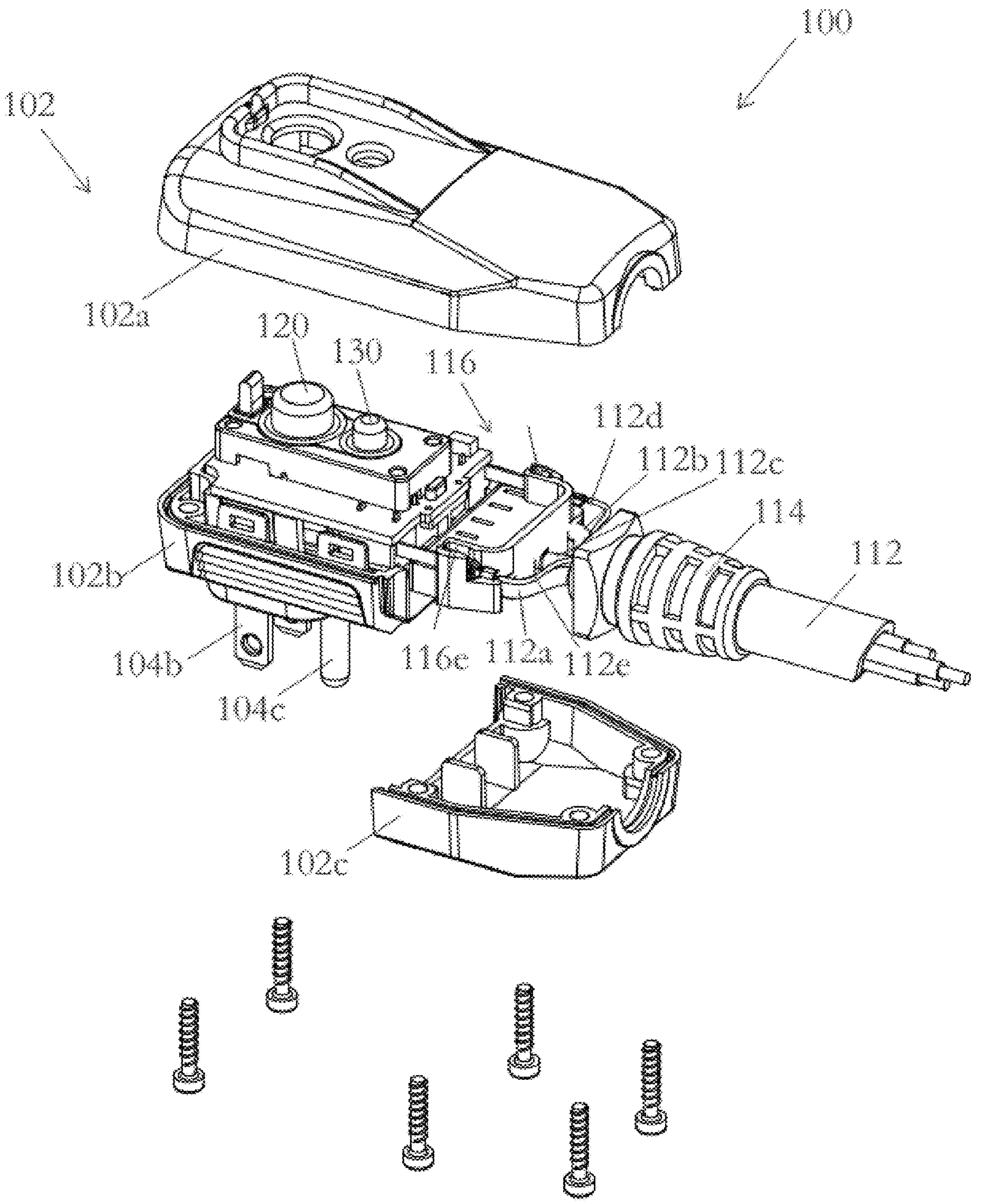
FIG. 4 is another exploded view of the power plug of FIG. 3 from another angle.

As shown in FIG. 4, the LCDI plug 100 further includes a switch 120 (reset switch) and a test switch 130. The reset switch 120 and test switch 130 are disposed on the movement assembly 106 and coupled to the control elements. The reset switch 120 is configured to reset the LCDI circuit, and the test switch 130 is configured to test whether the LCDI circuit is functioning normally. In alternative embodiments, the power plug may include only the reset switch, or only the test switch. In further alternative embodiments, the power plug does not include the reset switch and the test switch.

Figure 6:
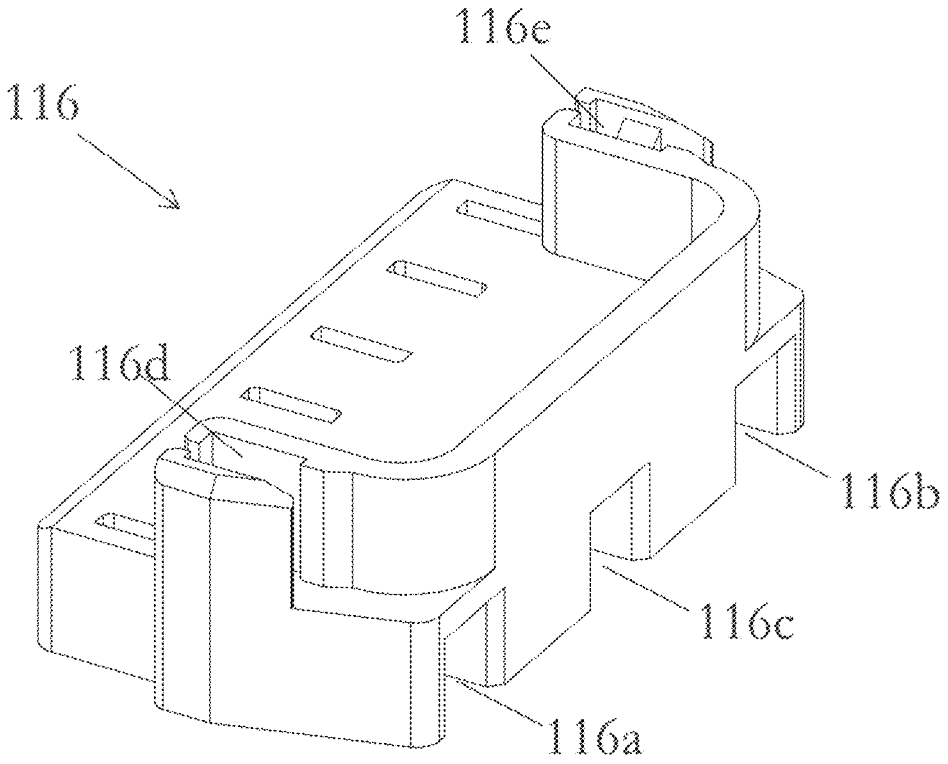
FIG. 6 shows the connector of FIG. 5 from another angle.

As shown in FIGS. 1, 5 and 6, the LCDI power plug 100 further includes a connector 116, disposed within the lower shell portion 102*a*. The connector 116 includes holding notches 116*a*, 116*b* and 116*c*, respectively configured to hold and affix the first, second and third female terminals 110*a*, 110*b* and 110*c*. The connector 116 further includes holding notches 116*d* and 116*e*, respectively configured to hold and affix the fourth and fifth female terminals 110*d* and 110*e* (the shield terminals). In alternative embodiments, the connector 116 may include clamps or other fasteners that replace the notches for affixing the first to fifth female terminals 110*a* to 110*e*. In other alternative embodiments, the connector 116 may include other affixing components to affix the female end assembly 110. In further alternative embodiments, the LCDI power plug includes no connector, where the male end assembly and the female end assembly are directly connected to each other (e.g. with the male end assembly being inserted into the female end assembly) and they are disposed together in the shell.

The assembly process of the LCDI power plug 100 includes:

(1) The input insertion prongs 104 and male end assembly 108 are mounted on the movement assembly 106.

(2) The movement assembly 106 is placed in a receiving cavity 1032 of the lower shell portion 102*a*.

(3) The conductors of the output conductor bundle 112 are respectively connected to the conductors of the female end assembly 110.

(4) The output conductor bundle 112 and female end assembly 110, which have been connected together, are affixed to the connector 116.

(5) The male end assembly 108 is inserted into the female end assembly 110, and the connector 116 is placed in another receiving cavity 1036 of the lower shell portion 102*a*.

(6) The cable strain relief 114 is placed around the output conductor bundle 112.

(7) An auxiliary shell portion 1024*b* (see FIG. 3) is placed over the movement assembly 106 to at least partly cover it.

(8) The first upper shell portion 102*b* is placed above the lower shell portion 102*a* to cover the movement assembly 106, with the input insertion prongs 104 extending out of the first upper shell portion 102*b* through the corresponding holes.

(9) The second upper shell portion 102*c* is placed above the lower shell portion 102*a* to cover the connector 116.

(10) The first upper shell portion 102*b* and second upper shell portion 102*c* are affixed to the lower shell portion 102*a* by screws.

It should be noted that in alternative embodiments, the auxiliary shell portion 1024*b* may be omitted.

Figure 7:
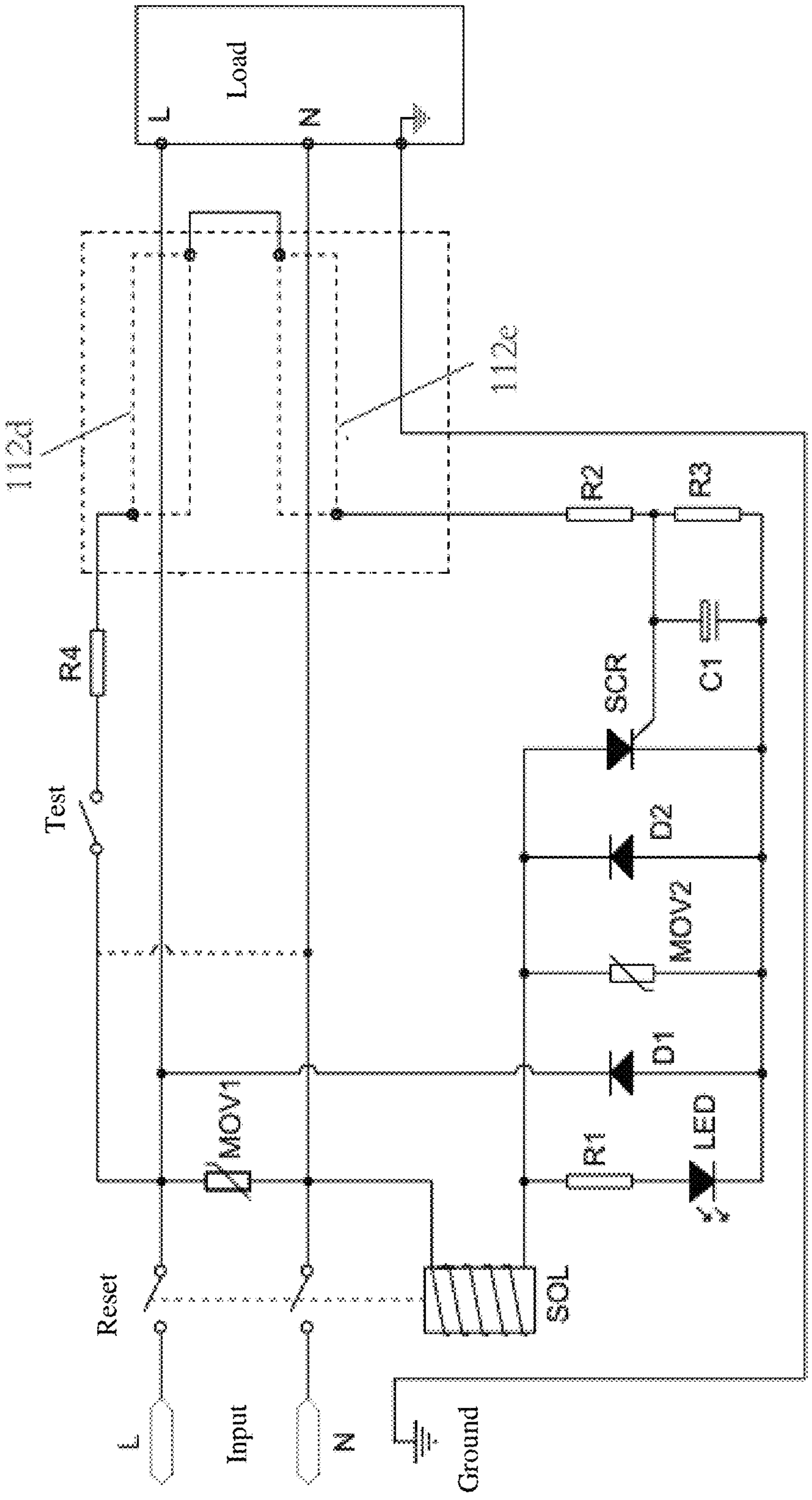
FIG. 7 is a circuit diagram of the LCDI circuit of the power plug according to an embodiment of the present invention.

FIG. 7 is a circuit diagram of the LCDI circuit of the power plug. When no leakage current is present on the hot (L) and neutral (N) lines, and the reset switch (Reset) is depressed (e.g. by the user manually), an electrical connection is established between the input end (Input) and the output end (Load). When a leakage current is detected on the L or N lines, the silicon-controlled rectifier SCR becomes conductive, so that the solenoid SOL generates a magnetic field which drives a trip plunger to move, thereby cutting off the electrical connection between the input end and the output end.

As shown in FIG. 7, the resistor R4 and the test switch (Test) are a part of a test circuit which simulates a leakage current in the circuit.

It should be understood that while in the illustrated embodiments, the input insertion prongs include three insertion prongs, in alternative embodiments the input insertion prongs group may include only two insertion prongs (i.e. the insertion prong is omitted); correspondingly, the male end assembly may include only four male terminals, two of which being coupled to the shield lines. In further alternative embodiments, the male end assembly may only include two male terminals, and does not include male terminals for coupling to the shield lines. In these alternative embodiments, the female end assembly may be modified accordingly. In other alternative embodiments, the group of input insertion prongs may include three or more (any number) insertion prongs.

In LCDI power plugs according to embodiments of the present invention, the output power lines and their internal components are connected together using insertion-type connection, which improves efficiency of assembly of the LCDI power plug.

While the present invention is described above using specific examples, these examples are only illustrative and do not limit the scope of the invention. It will be apparent to those skilled in the art that various modifications, additions and deletions can be made to the LCDI power plug of the present invention without departing from the spirit or scope of the invention.

What is claimed is:

1. A power plug with a leakage current detection interrupter (LCDI), comprising:

a shell, including a lower shell portion and an upper shell portion joined together;

a plurality of input insertion prongs, partially exposed to an exterior of the shell, including a first, a second, and a third insertion prong;

a plurality of output conductors, including a first output conductor which is a hot line conductor, a second output conductor which is a neutral line conductor, a third output conductor which is a ground line conductor, a first shield conductor disposed outside the hot line conductor, and a second shield conductor disposed outside the neutral line conductor;

a movement assembly disposed in the shell and coupled to the plurality of input insertion prongs and the plurality of output conductors, wherein the movement assembly is configured to establish or cut off an electrical connection respectively between the first, second and third input insertion prongs and the first, second and third output conductors;

a male end assembly disposed in the shell, including a first, a second, a third, a fourth and a fifth male terminal, wherein first ends of the first and second male terminals are affixed to the movement assembly and respectively electrically coupled to the first and second insertion prongs via the movement assembly, a first end of the third male terminal is coupled to the third insertion prong, and first ends of the fourth and fifth male terminals area affixed to the movement assembly; and a female end assembly disposed in the shell, including a first, a second, a third, a fourth and a fifth female terminal, wherein second ends of the first, second and third female terminals are respectively coupled to the first, second and third output conductors, and second ends of the fourth and fifth female terminals are respectively coupled to the first and second shield conductors;

wherein both the male end assembly and the female end assembly are entirely disposed within the shell between the lower shell portion and the upper shell portion, and wherein second ends of the first to fifth male terminals of the male end assembly are respectively inserted into a first ends of the first to fifth female terminals of the female end assembly.

2. The power plug of claim 1, further comprising a connector disposed in the shell, the connector including affixing components to affix the female end assembly.

3. The power plug of claim 2, wherein the affixing components include a plurality of holding notches on the connector.

4. The power plug of claim 2, wherein the affixing components include a plurality of clamps on the connector.

5. The power plug of claim 1, wherein the upper shell portion includes a first upper shell portion and a second upper shell portion.

6. The power plug of claim 1, further comprising a reset switch or a test switch or both a reset switch and a test switch, coupled to the movement assembly.

7. The power plug of claim 1, wherein the shell includes a plurality of portions fixedly joined to each other to form one body.

* * * * *